United States Patent
Dosluoglu et al.

(10) Patent No.: US 6,924,887 B2
(45) Date of Patent: *Aug. 2, 2005

(54) METHOD AND APPARATUS FOR GENERATING CHARGE FROM A LIGHT PULSE

(75) Inventors: Taner Dosluoglu, New York, NY (US); Robert Amantea, Manalapan, NJ (US); Peter Alan Levine, West Windsor, NJ (US); Robin Mark Adrian Dawson, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,343

(22) Filed: Dec. 1, 2003

(65) Prior Publication Data

US 2004/0169842 A1 Sep. 2, 2004

Related U.S. Application Data

(63) Continuation-in-part of application No. 10/107,966, filed on Mar. 27, 2002, now Pat. No. 6,657,706.

(51) Int. Cl.[7] ............................. G01C 3/08; G01F 8/00
(52) U.S. Cl. .................... 356/5.01; 356/4.01; 356/4.07; 356/5.08
(58) Field of Search ...................... 356/4.01, 5.01–5.08; 368/121

(56) References Cited

U.S. PATENT DOCUMENTS

| | | |
|---|---|---|
| 3,731,195 A * | 5/1973 | Wessel ........................ 368/121 |
| 5,056,914 A | 10/1991 | Kollodge |
| 5,162,861 A | 11/1992 | Tamburino et al. |
| 5,319,611 A | 6/1994 | Korba |
| 5,357,331 A | 10/1994 | Flockencier |
| 5,446,529 A | 8/1995 | Stettner et al. |
| 5,641,919 A | 6/1997 | Dahneke |
| 5,682,229 A | 10/1997 | Wangler |
| 5,835,204 A | 11/1998 | Urbach |
| 5,870,180 A | 2/1999 | Wangler |
| 6,133,989 A | 10/2000 | Stettner et al. |
| 6,137,566 A | 10/2000 | Leonard et al. |
| 6,323,941 B1 | 11/2001 | Evans et al. |
| 6,323,942 B1 | 11/2001 | Bamji |
| 6,346,980 B1 * | 2/2002 | Tani et al. ................. 356/4.01 |
| 6,448,572 B1 * | 9/2002 | Tennant et al. ........ 250/559.38 |

FOREIGN PATENT DOCUMENTS

WO    WO 98/10255    3/1998

* cited by examiner

*Primary Examiner*—Bernarr E. Gregory
*Assistant Examiner*—Isam Alsomiri
(74) *Attorney, Agent, or Firm*—William J. Burke

(57) ABSTRACT

A method and apparatus for generating charge from a light pulse. In one example, a light sensor includes an active region for generating an electric charge in response to a light pulse. A drift region is formed within a substrate and receives the electric charge from the light sensor. A spatial charge distribution is produced within the drift region in response to an electric field. The drift region includes an outer edge and an inner edge. The volume of the drift region decreases from the outer edge to the inner edge.

27 Claims, 8 Drawing Sheets

METHOD AND APPARATUS FOR GENERATING CHARGE FROM A LIGHT PULSE

CROSS-REFERENCE TO RELATED APPLICATIONS

This application claims benefit of U.S. provisional patent application Ser. No. 60/434,099, filed Dec. 17, 2002, and is a continuation-in-part of U.S. patent application Ser. No. 10/107,966, filed Mar. 27, 2002, now U.S. Pat. No. 6,657,706 each of which is incorporated by reference herein in its entirety.

GOVERNMENT RIGHTS IN THIS INVENTION

This invention was made with U.S. government support under contract number NRO000-02-C-0394 awarded by the National Reconnaissance Office. The U.S. government has certain rights in this invention.

BACKGROUND OF THE INVENTION

1. Field of the Invention

The present invention generally relates to sensing, receiving, and processing light signals and, more particularly, to generating charge from a light pulse.

2. Description of the Related Art

In general, three-dimensional imaging systems employing active sources, such as laser detection and ranging (LADAR) systems, suffer from one primary problem: sensors designed to obtain two-dimensional amplitude images are not adept at rendering an image in three-dimensions. While there have been many attempts at adopting such two-dimensional sensors to three-dimensional imaging, such systems have always been found to be lacking, particularly in range resolution and sensitivity.

For example, one type of known three-dimensional imaging approach uses very high pixel sampling rates in various forms to determine time of flight for the laser pulse to travel from the laser to a target and on to a detector. The time of flight of an illuminating pulse is very difficult to measure since one nanosecond of time resolution is required to achieve one foot of depth resolution. As such, these systems typically employ high-speed counting and high-speed clocking circuits for operation. In cases where a depth resolution of inches is necessary (i.e., sub-nanosecond time differences must be resolved), the required operating speed of these counting and clocking circuits is difficult to achieve. Other known systems measure phase shifts between the illuminating signal and the signal returned from the target. These systems are susceptible to noise and provide inadequate sensitivity when the signal reflected from the target is very weak.

Therefore, there exists a need in the art for a method and apparatus for accurately resolving sub-nanosecond differences between times-of-arrival of light pulses.

SUMMARY OF THE INVENTION

The present invention is a device for resolving relative times-of-arrival of a plurality of light pulses comprising a plurality of drift-field detectors. Each drift-field detector comprises a light sensor and a semiconductor drift region. Each light sensor generates an electrical charge from at least one of the plurality of light pulses. Each semiconductor drift region receives the electrical charge from its respective light sensor and, pursuant to an electric field therein, produces a spatial charge distribution. The spatial charge distribution for each of the semiconductor drift regions is stored in an analog storage device associated therewith. In one embodiment of the invention, the analog storage devices comprise charge-coupled device (CCD) registers. The relative positions of the charge distributions in the semiconductor drift regions can be used to calculate the relative times-of-arrival of the light pulses. The present invention can be used in three-dimensional imaging applications, where the relative times-of-arrival of reflected light pulses are used to calculate the depth of the scene.

Another aspect of the invention relates to a method and apparatus for generating charge from a light pulse. In one embodiment of the invention, a light sensor includes an active region for generating an electric charge in response to a light pulse. A drift region is formed within a substrate and receives the electric charge from the light sensor. A spatial charge distribution is produced within the drift region in response to an electric field. The drift region includes an outer edge and an inner edge. The volume of the drift region decreases from the outer edge to the inner edge.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

The present invention is an apparatus for resolving relative times-of-arrival of light pulses without relying upon high-speed counting and clocking circuitry. As described in detail below, the present invention comprises a plurality of drift-field detectors generally formed in an array. Each drift-field detector comprises a semiconductor drift region coupled to a light sensor. The present invention resolves relative times-of-arrival of light pulses by measuring the distance a photo-generated charge packet moves through an electric field in the drift region for each drift-field detector. The apparatus of the present invention can be used in three-dimensional imaging applications, where a drift-field detector is used at each pixel of a three-dimensional image sensor and the time-of-arrival of a reflected light pulse incident on each pixel in the imaging array is used to produce a three-dimensional image. By eliminating clocking limitations, the present invention can resolve sub-nanosecond time-of-arrival differentials, advantageously providing depth information in an imaged scene to an accuracy of a centimeter or better. Those skilled in the art will appreciate that the present invention is useful in any application that requires resolving relative times-of-arrival of light pulses with high accuracy.

Figure 1:
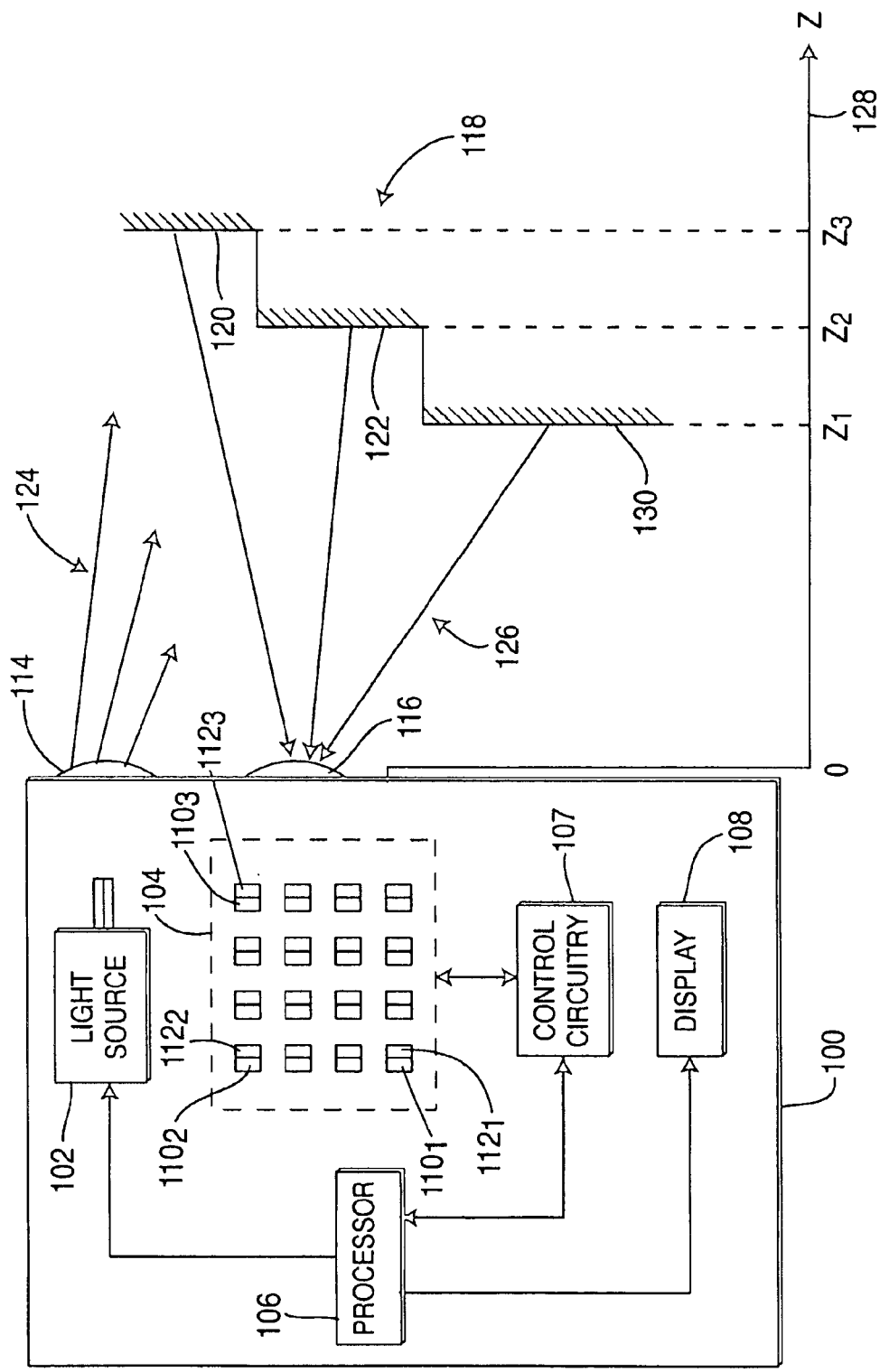
FIG. 1 depicts a block diagram showing an exemplary three-dimensional imager incorporating an array of drift-field detectors of the present invention.

FIG. 1 depicts a block diagram showing an exemplary three-dimensional imaging system 100 incorporating the apparatus of the present invention. The system 100 comprises a light source 102, a drift-field detector array 104, a processor 106, control circuitry 107, and a display 108. The light source 102 produces light pulses 124 to illuminate a target 118. The light pulses 124 reflect from the target 118 and are focused onto the drift-field detector array 104 by an optical lens 116. The detected light signals are processed by processor 106, under control of control circuitry 107, for display as an image on display 108.

More specifically, the light source 102 comprises a light emitting diode (LED) or laser source capable of emitting a pulse of light 124 of a particular wavelength. The wavelength of the light pulse 124 depends upon the particular application of the imager 100, and is generally in the range between ultraviolet and infrared wavelengths. As shown, the light pulse 124 passes through optical lens 114 before traveling to a target 118. Alternatively, the light source 102 can transmit the light pulse 124 to the target 118 without the aid of the optical lens 114 if the light source 102 is sufficiently powerful.

Axis 128 represents the distance between the target 118 and the system 100, with the origin at the system 100. The target 118 comprises a first portion 130 that is a distance $Z_1$ from the system 100, a second portion 122 that is a distance $Z_2$ from the system 100, and a third portion 120 that is a distance $Z_3$ from the system 100. The light pulse 124 illuminates the target 118, causing at least some of the light to be reflected back toward the system 100 in the form of reflected light 126. The reflected light comprises a multiplicity of scattered light pulses. The reflected light 126 passes through optical lens 116, which focuses the reflected light 126 onto the drift-field detector array 104. The drift-field detector array 104 comprises a plurality of drift-field detectors $110_1$ through $110_N$ (collectively 110) and respective analog storage devices $112_1$ through $112_N$ (collectively 112). A 4×4 array of drift-field detectors 110 is shown for simplicity, but the present invention can have an M×N array of drift-field detectors 110, where M and N are integers having a value of 1 or more. The optical lens 116 operates such that a reflected light pulse from a point on the surface of the target 118 will only fall upon the $i^{th}$ drift-field detector $110_i$ in the array 104 that is focused upon such point. That is, each of the drift-field detectors 110 has a field of view (FOV) that dictates which light pulses in the reflected light 126 will be detected by a given drift-field detector $110_i$.

Figure 2:
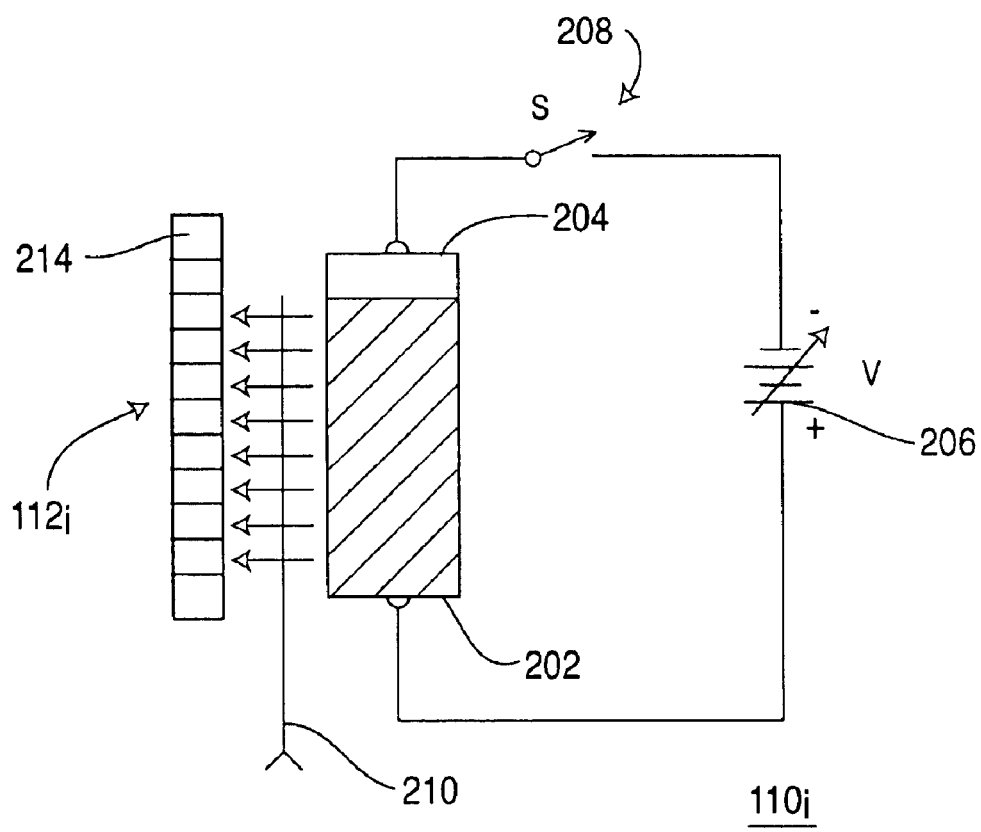
FIG. 2 depicts a schematic diagram showing a single drift-field detector.

FIG. 2 depicts a schematic diagram showing an individual drift-field detector $110_i$ in accordance with the present invention. The drift-field detector $110_i$ comprises a light sensor 204 and a semiconductor drift region 202. The light sensor 204 comprises a light sensitive detector, such as a silicon photodetector (e.g., a PIN photogate detector). The choice of light sensitive detector for the light sensor 204 is dictated by the wavelength of operation. For example, if the light source 102 of the system 100 transmits an illuminating pulse in the ultraviolet or visible spectrum, then the light sensor 204 can comprise a silicon photodetector. If the light source 102 of the system 100 transmits an illuminating pulse in the short-wave infrared light (SWIR) spectrum, the light sensor 204 can comprise a platinum silicide detector, or a III–IV detector and appropriate readout circuitry (e.g., control circuitry 107). In this manner, the present invention can provide for an "eye-safe" imaging system. In any case, all that is required is for the light sensor 204 to generate a charge proportional to the amount of incoming photon energy incident upon it, and that this charge be injected into the drift region 202 in the form of electrons or holes, as described below.

In one embodiment, the drift region 202 comprises an N-buried channel formed in silicon having a known length. Alternatively, the drift region 202 can be formed of P-type silicon, wherein holes are injected into the drift region 202 from the light sensor 204. In either case, the drift region 202 is electrically coupled to the light sensor 204 such that charge (be it electrons or holes) is injected into the drift region 202 from the light sensor 204 when light is detected. In one embodiment, the light sensor 204 and the drift region 202 are formed monolithically on a silicon substrate. This allows for production of the drift-field detector $110_i$ in standard silicon foundries using standard design rules for cost-effective fabrication. In addition, the appropriate detector readout circuitry (e.g., control circuitry 107) can be incorporated into the same silicon substrate as the drift region. Alternatively, the light sensor 204 can be fabricated apart from the drift region 202 and then be bump bonded thereto.

A variable voltage source 206 is coupled on one end to the light sensor 204, and on the other end to the drift region 202. The variable voltage source 206 generates an electric field in the drift region 202. The voltage of voltage source 206 is controlled by processor 106 through control circuitry 107. In the embodiment shown, the variable voltage source 206 is coupled using ohmic connections. Alternatively, the variable voltage source 206 can be coupled to the light sensor 204 and drift region 202 via a plurality of gates (not shown) disposed thereon for generating the electric field. In any case, the variable voltage source 206 is controlled via switch 208. Switches 208 for the drift-field detectors 110 are controlled via control circuitry 107. In one embodiment, control circuitry 107 comprises a CMOS multiplexer capable of selectively controlling each switch 208 in the array 104, as well as the voltage applied by respective variable voltage source 206. In this manner, the processor 106 can control the electric field for specific ones of the drift-field detectors 110. In such an embodiment, the CMOS multiplexer can be formed monolithically with the light sensors 204 and/or the drift regions 202.

In addition, the drift region 202 is associated with an analog storage device $112_i$. The analog storage device $112_i$ can comprise a charge-coupled device (CCD) register having a plurality of bins 214 formed therein. In such an embodiment, the analog storage device $112_i$ can be formed monolithically with the light sensor 204 and/or the drift region 202. CCD transfer gate 210 acts as the interface between the drift region 202 and the analog storage device $112_i$ for the transfer of charge therebetween. Each CCD transfer gate 210 is controlled by control circuitry 107. In one embodiment, control circuitry 107 comprises a second CMOS multiplexer capable of selectively controlling each CCD transfer gate 210 in the array 104. In this manner, the processor 106 can control the charge transfer between specific ones of the drift-field detectors 110 and their respective analog storage device 112. Again, the second CMOS multiplexer can be formed monolithically with the other components of the array 104.

In operation, a light pulse strikes the surface of the light sensor 204 and photon energy is converted into electric charge. The charge integration time for the light sensor 204 can be gated using control gates and a charge dump drain (not shown). The electric charge is injected into the drift region 202. The variable voltage source 206 supplies a voltage differential across the drift region 202 such that an electric field is produced therein. This electric field is enabled and disabled by switch 208. When the electric field is applied, the charge injected into the drift region 202 moves through the semiconductor material at a rate determined by the electric field combined with thermal diffusion. This rate also depends upon other factors, such as the type and temperature of the semiconductor material. Thus, a charge distribution will form in the drift region 202 having a certain shape and position. When the electric field is removed (by opening switch 208), the charge distribution will remain fixed within the drift region 202, but the shape will continue to disperse due to thermal diffusion. The velocity of electrons due to thermal diffusion, however, can be adjusted to be much less than the velocity of electrons where the electric field is applied to the drift region 202.

In order to retain the position and shape of the charge distribution in the drift region 202, the charge distribution is transferred to the analog storage device $112_i$. The position of the charge distribution in the drift region 202 essentially "freezes" for a time long enough to move the charge from the drift region 202 to the analog storage device $112_i$. In the present embodiment, the analog storage device $112_i$ is a CCD register having a plurality of bins 214 capable of storing charge. Specifically, once the electric field is removed from the drift region, CCD transfer gate 210 operates to transfer the charge distribution from the drift region 202 to the plurality of bins 214. The number of bins 214 depends on the desired resolution of the charge distribution. That is, more bins 214 in the CCD register results in the storing of more detail of the shape and position of the charge distribution in the drift region 202. In one embodiment, the transfer time from the drift region 202 to the bins 214 is in the range of 5 to 20 ns at room temperature to keep the thermally induced dispersion in the drift region within desirable limits. The operation of the analog storage devices 112 is described in more detail below with respect to FIG. 3.

Returning to FIG. 1, since portion 120 of the target 118 is farther away from the system 100 than portion 122, light reflected from portion 120 will take longer to reach the system 100 than light reflected from portion 122. Thus, different light pulses in the reflected light 126 will arrive at the system 100 at different times. The difference between times-of-arrival of light pulses can be used to determine the depth of the scene. The present invention can resolve the relative times-of-arrival of light pulses incident on an array of drift field detectors 104 using the charge distribution in each of the drift field detectors 110.

Specifically, each of the drift-field detectors 110 is activated (i.e., the switch 208 is closed and the electric field applied in each drift region 202 via control circuitry 107) at some time $t_{start}$ after the illuminating pulse 124 has been transmitted. This time can coincide with the arrival of the first light pulse reflected from the target 118, but this does not necessarily have to be the case. The time $t_{start}$ can coincide with the arrival of the first light pulse of interest that is reflected from the target 118. As described more fully below, the time difference between when the illuminating pulse 124 is transmitted and when the drift-field detectors 110 are activated controls the range of the system 100.

Assume that one particular drift-field detector $110_1$ within the array 104 is focused upon portion 130 of target 118. The associated drift-field detector $110_1$ will detect the reflected light pulse and generate a charge packet in response to the incoming photon energy. This charge is injected into the associated drift region 202 and begins to drift in response to the electric field. At some later time, a reflected light pulse will arrive at optical lens 116 from portion 122 of target 118 and will be detected by another drift-field detector $110_2$. Again, the charge will be injected into the drift region 202 of this second drift-field detector $110_2$ and will begin to drift. Hitherto the charge in the drift region 202 of the first drift-field detector $110_1$ has continued to drift. In a similar fashion, another drift-field detector $110_3$ will detect a reflected light pulse from portion 120 of target 118 at yet a later time. This charge is injected into the drift region 202 of this third drift-field detector $110_3$ and will begin to drift. Again, hitherto the charge in both drift regions 202 of the first and second drift-field detectors $110_1$ and $110_2$ has continued to drift. Finally, at some time $t_{stop}$ the electric fields in the drift regions 202 of the drift-field detector array 104 will be turned off, and all drifting of charge will cease (with the exception of thermal diffusion, as described above).

As described above, the charge distributions in the drift-field detectors 110 are transferred to analog storage devices 112 at some time after $t_{stop}$. The processor 106 can then read the charge from the analog storage devices 112 via control circuitry 107. Once read out, the processor 106 uses the relative positions of the charge distributions in the drift regions 202 to calculate the relative times-of-arrival of the light pulses. Given the relative times-of-arrival of the light pulses, the processor 106 can compute a three-dimensional image that can be shown on display 108.

Figure 4A:
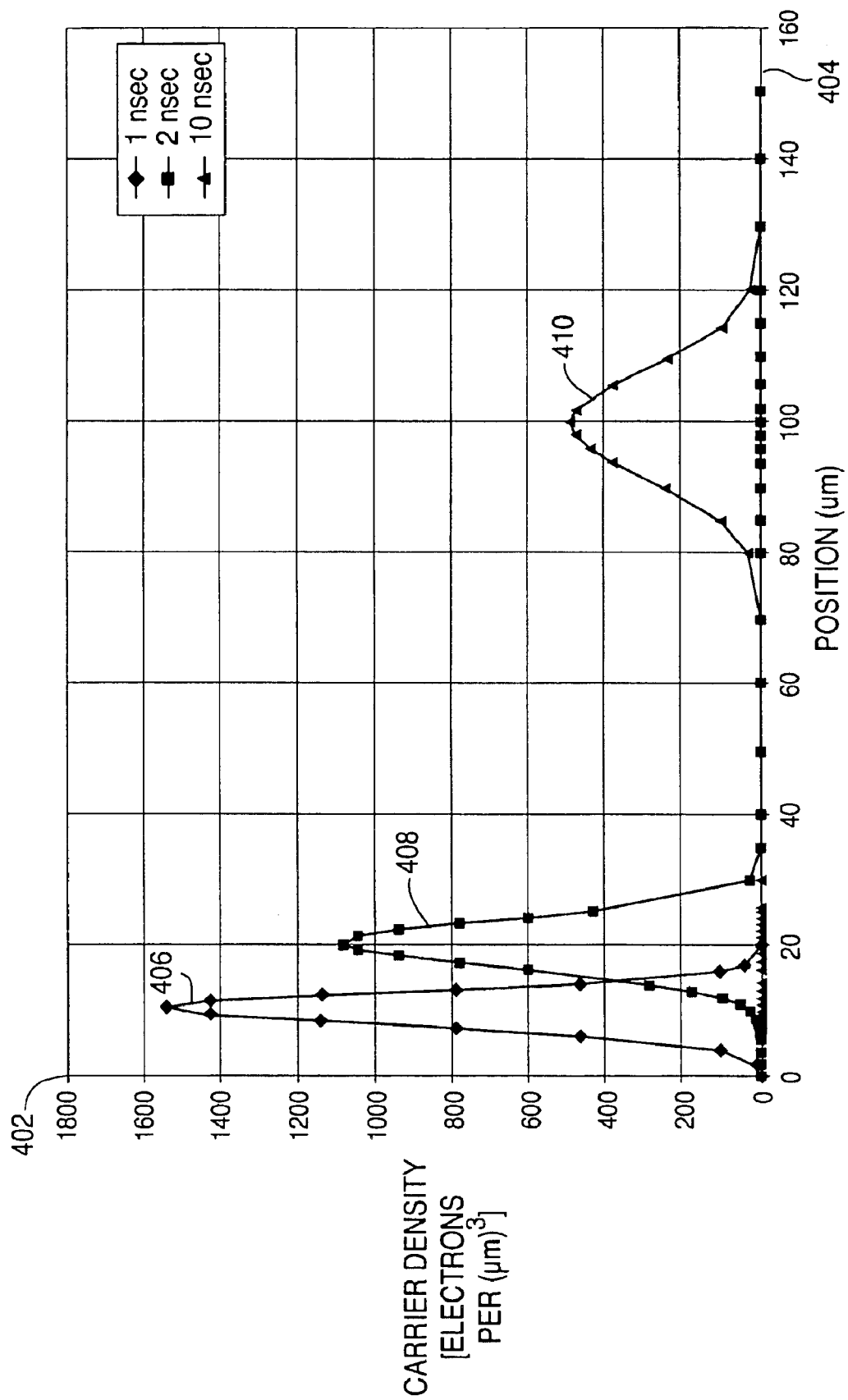
FIGS. 4A through 4C are graphs showing charge distributions in drift regions of three drift-field detectors of the present invention.
Figure 4B:
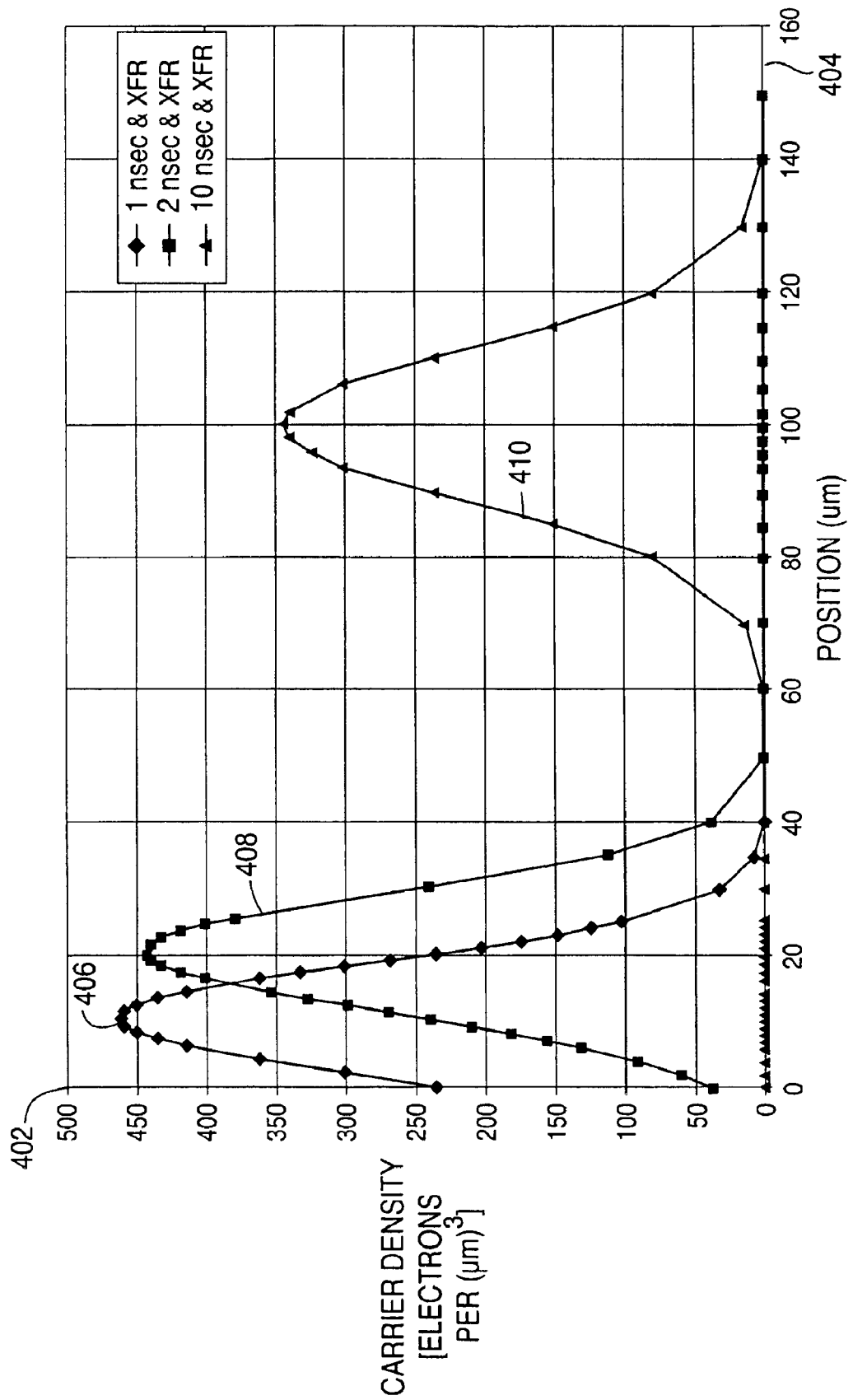
Figure 4C:
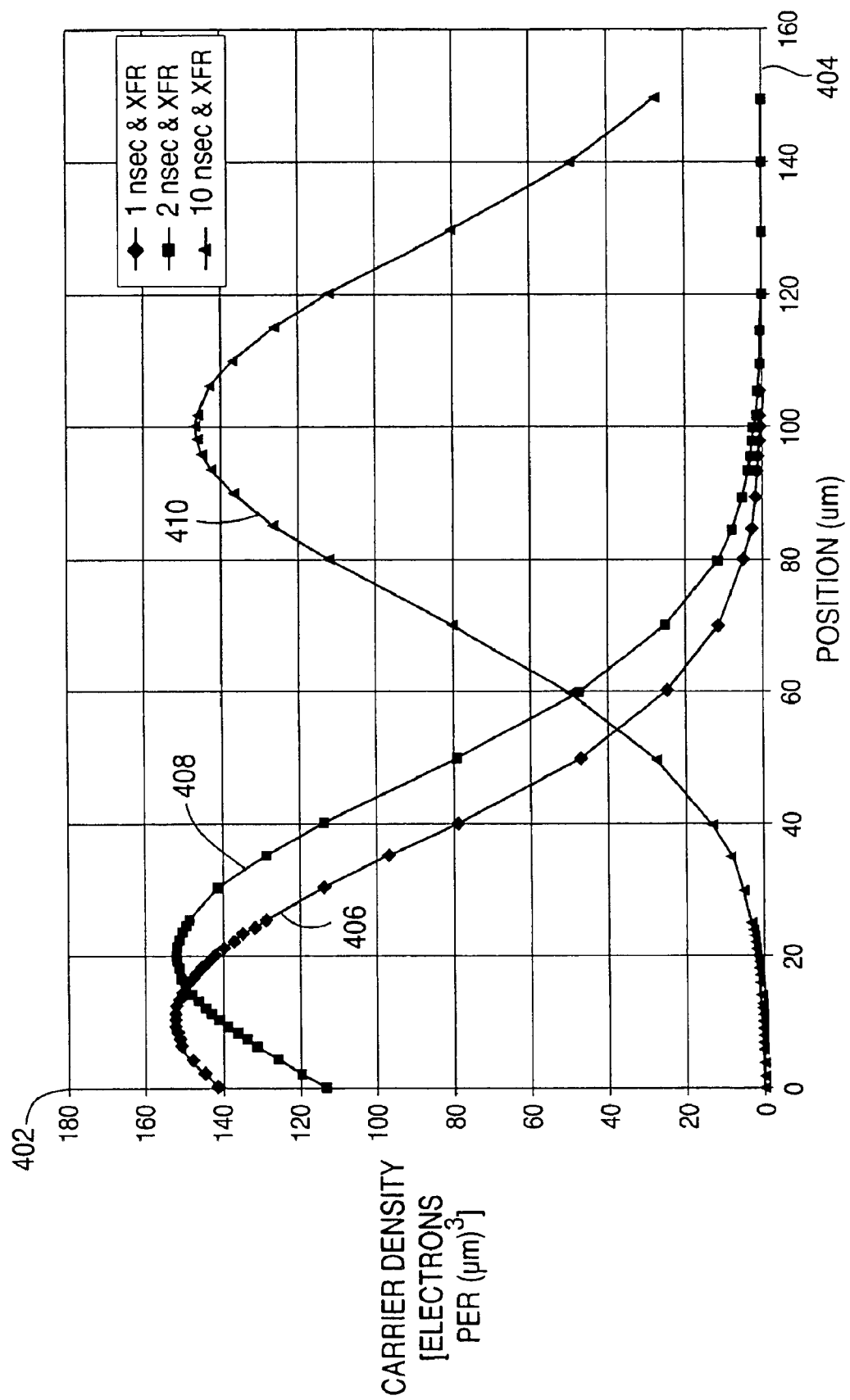

FIGS. 4A through 4C are graphs showing charge distributions in drift regions of the three drift-field detectors $110_1$, $110_2$, and $110_3$. FIGS. 4A through 4C share common axes. Axis 402 represents the carrier density in the drift region 202 having units of electrons per $\mu m^2$. Axis 404 represents position in the drift region 202 having units of $\mu m$. Assume each drift region has a length of approximately 100 $\mu m$ and an electric field of approximately 10 V/100 $\mu m$. Assume also that time $t_{start}$ is time t=0, and time $t_{stop}$ is time t=10 ns. Finally, assume that the first light pulse arrives at time t=0, the second light pulse arrives at time t=8 ns, and the third light pulse arrives at time t=9 ns.

FIG. 4A shows the charge distributions right after the electric fields are removed from the three drift regions at time t=10 ns. Curve 410 represents the charge distribution in the drift region 202 of the first drift-field detector $110_1$, curve 408 represents the charge distribution in the drift region 202 of the second drift-field detector $110_2$, and curve 406 represents the charge distribution in the drift region 202 of the third drift-field detector $110_3$. After 10 ns of the applied electric field, the centroid of the charge distribution 410 has drifted to a position of 100 μm. After 2 ns of the applied electric field, the centroid of the charge distribution 408 has drifted to a position of 20 μm. Finally, after 1 ns of the applied electric field, the centroid of the charge distribution 406 has drifted to a position of 10 μm. The shape of each charge distribution spreads due to thermal diffusion as it drifts due to the electric field. The effects of thermal diffusion are most apparent in the drift region of the first drift-field detector $110_1$, where the charge has been drifting for 10 ns (i.e., curve 410).

As can be seen from FIG. 4A, sub-nanosecond differences between times-of-arrival of light pulses can be easily discerned using centroid detection. Using known diffusion characteristics, it is possible to find the centroid of a charge distribution with high accuracy (e.g., better than a tenth of a nanosecond). Given the start time of the electric field, the position of the centriod of the charge distribution, and the rate of drift in the semiconductor material, the time-of-arrival of the light pulse that gave rise to the injected charge can be determined. Thus, each drift-field detector $110_i$ in the array 104 can collect information to determine the relative time-of-arrival of a light pulse striking its light sensor 204.

FIGS. 4B and 4C show the effects of thermal diffusion on the charge distributions in drift-field detectors $110_1$, $110_2$, and $110_3$. FIG. 4B shows the charge distributions 10 ns after the electric field has been removed. As the charge thermally diffuses, the peak amplitude of the distribution decreases. The centroid, however, remains in a fixed position. FIG. 4C shows the normalized charge distributions 100 ns after the electric field has been removed. As illustrated, the charge distributions almost completely overlap, and thus make it difficult to distinguish among their positions to determine the times-of arrival. In one embodiment, the charge distribution in each drift region 202 is transferred into its respective analog storage device $112_i$ within 5 to 20 ns after the electric field is removed.

The length of the drift region 202 and the magnitude of the electric field dictate the time $t_{stop}$. In the above example, the drift region 202 of each the drift-field detectors 110 was 100 μm and the electric field was 10 V/100 μm. In that example, each of the drift-field detectors 110 could only be activated for 10 ns after the first signal of interest arrived. If they were activated for any longer, charge would begin to drift out of the drift region 202, and time-of-arrival data for the first incoming reflected light pulses would be lost. In that example, the drift-field detector array 104 can resolve centimeters of resolution with a total range of about 30 meters. Thus, the length of the drift field 202 and the magnitude of the electric field dictate the maximum depth range of the system 100. The time $t_{start}$ controls where the range begins. That is, the range is a window that can be moved forward and away from the system 100 by controlling when the drift-field detectors 110 are activated relative to the emission of light pulses 124. The resolution and depth range can be zoomed by varying the magnitude of the electric field (by varying the voltage of variable voltage supply 206). For example, the electric field can be set such that the drift-field detector array 104 can resolve millimeters of resolution with a total range of about 3 meters. Additionally, particular groups of drift-field detectors 110 can have a higher or lower magnitude electric field than other groups by employing selective control via control circuitry 107. In one embodiment, selective control is implemented via CMOS multiplexers as described above. In such an embodiment, the drift-field detector array 104 would allow the system 100 to zoom in on particular portions of the target 118.

Figure 5:
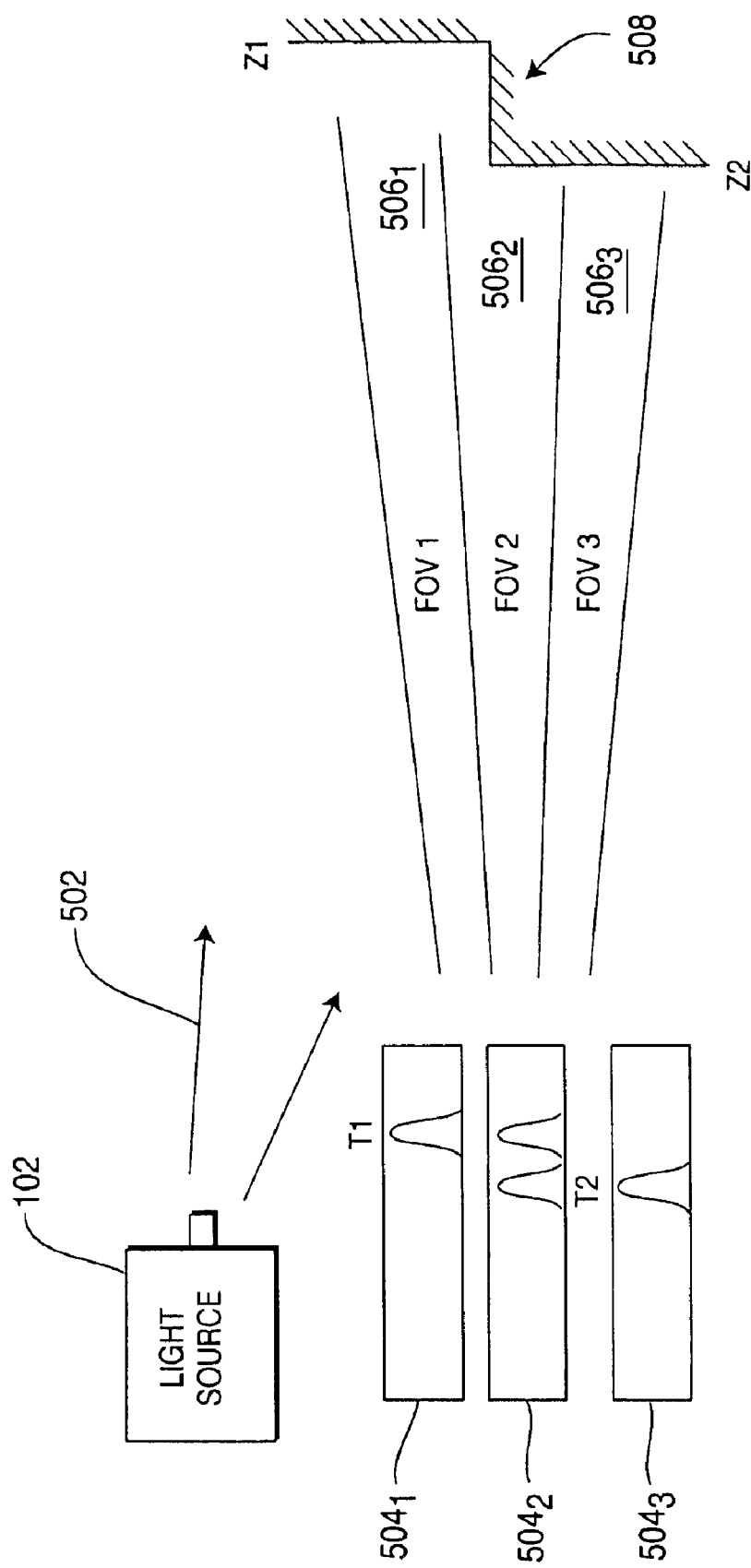
FIG. 5 illustrates multiple light pulses having different times-of-arrival striking a signal drift-field detector of the present invention.

The above discussion assumed that three light pulses differing in times-of-arrival struck three different drift-field detectors $110_1$, $110_2$, and $110_3$. FIG. 5 illustrates a case where multiple light pulses that differ in times-of-arrival strike a single drift-field detector. As shown, light source 102 transmits an illuminating pulse 502 towards the target 508. Drift fields $504_1$, $504_2$, and $504_3$ for three drift-field detectors are shown, having fields of view $506_1$, $506_2$, and $506_3$, respectively. The field of view $506_2$ for the second drift field $504_2$ covers portions of the target 508 having two different depths $Z_1$ and $Z_2$. Thus, drift field $504_2$ will contain two discernible charge distributions. This result is inherent in the design of the present invention. Thus, the present invention can advantageously discern multiple distances within a single drift-field detector using a signal illuminating pulse. Resolving multiple distances within a single drift-field detector significantly enhances the processing of three-dimensional data.

Figure 3:
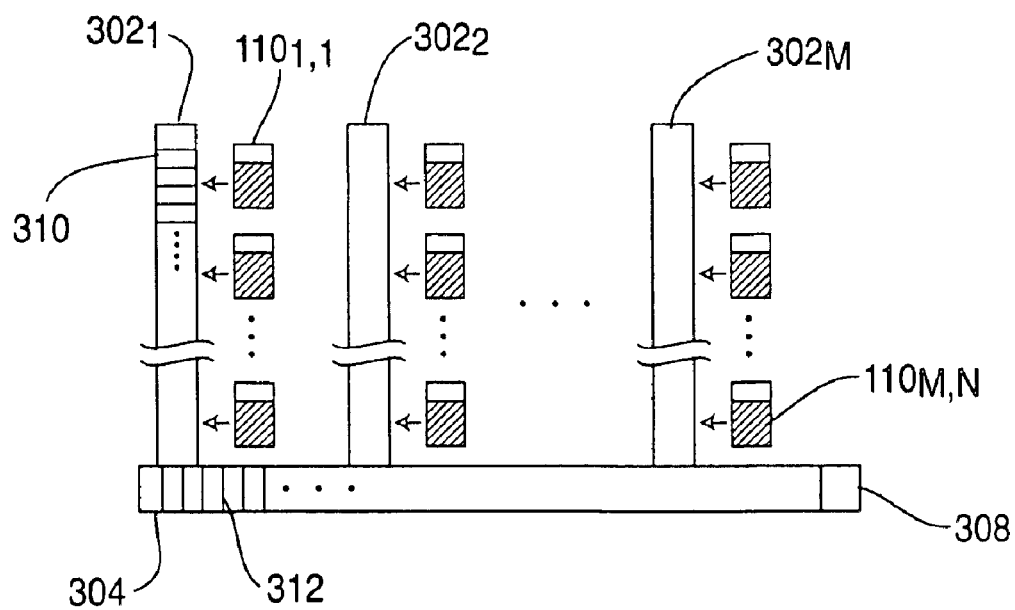
FIG. 3 depicts a block diagram showing one embodiment of analog storage devices for use with the present invention.

FIG. 3 depicts a block diagram showing one embodiment of analog storage devices 112. The analog storage devices 112 comprise M vertical CCD registers $302_1$ through $302_M$ (collectively 302), a horizontal CCD register 304, and an electrometer 308. Each of the vertical CCD registers 302 comprises a multiplicity of bins 310 for storing charge. The horizontal CCD register 304 also comprises a multiplicity of bins 312. An M×N array of drift-field detectors 110 is shown. Each column of drift-field detectors 110 is associated with one of the vertical CCD registers 302. Each of the vertical CCD registers 302 is further coupled to the horizontal CCD register 304. Operation is in accordance with what is known in the art as interline transfer. The charge distribution in each drift region is first transferred to bins 310 substantially as described above with respect to FIG. 2. Then, for each of the vertical CCD registers 302, the charge in a first set of bins 310 associated with the first drift-field detector 110 in the column is transferred to bins 312 in the horizontal CCD register 304. The horizontal CCD register 304 comprises at least enough bins 312 to hold charge data from a detector in each of the vertical CCD registers 302. All the charge in each of the vertical CCD registers 302 is then moved down in charge-transfer fashion to fill the empty bins.

Once this first set of charge is in the horizontal CCD register 304, this charge is transferred using standard CCD practice to be detected by electrometer 308. The electrometer 308 can comprise a floating diffusion electrometer stage known in the art. The electrometer 308 converts charge to voltage, which then can be read out by the processor 106 through control circuitry 107 of FIG. 1. The processor 106 then displays the information on display 108. This process repeats until all of the charge is read out from the analog storage devices 112.

The embodiment shown in FIG. 3 for the analog storage devices 112 allows the present invention to bin multiple fields from the drift regions. Specifically, a first illuminating pulse illuminates the target as described above with respect to FIG. 1. The drift-field detectors 110 detect the reflected light pulses, and the analog storage devices 112 store the charge distributions. At this point, however, the vertical CCD registers 302 are not read into the horizontal CCD register 304. A second illuminating pulse illuminates the target and the process is repeated. After each reflected pulse, the charge in each drift region drifts to give time resolution, the field is removed, and the charge pattern is loaded into the vertical CCD register 304. The summing of charge, or "charge binning", in the analog storage devices 112 is substantially noiseless. In this embodiment, the time separation of the illuminating pulses must be greater than the maximum drift time plus the transfer time from the drift regions to the analog storage devices 112. Charge binning allows the present invention to detect reflected light pulses that are very weak thereby increasing system sensitivity.

The use of CCD registers for the analog storage devices 112 also provides very low readout noise capability. The CCD registers can be cooled using thermoelectric coolers (not shown) so that the binning of charge and readout can be carried over tenths of seconds. It is important to note that the slower the charge is read out from the analog storage locations 112, the less noise is introduced into the system. The present invention advantageously allows for very slow readouts when imaging in noisy environments.

In yet another embodiment, the signal-to-noise ratio of the X and Y resolution information provided by array 104 can be further improved by charge binning the charge distribution after the depth information has been obtained. Specifically, the invention operates as described above to obtain a three-dimensional image. That is, the charge distribution from each of the drift-field detectors 110 is stored in the analog storage devices 112. Charge binning can be used to increase system sensitivity. Then, a non-destructive readout of the charge distributions is performed to obtain the information necessary to display the depth of the scene. Then, the charge distribution for each of the drift-field detectors 110, spread over multiple bins in the vertical CCD registers 302, can be binned into a single CCD stage (e.g., a single CCD stage in horizontal CCD register 304) representing a pixel associated with the X and Y position of that particular drift-field detector 110. This second stage of charge binning increases the signal-to-noise ratio for a second readout of the two-dimensional information. That is, the charge distributions are summed so as to represent a pixel of the scene without depth information. In another embodiment, only a subset of the drift-field detectors have their charge binned into a single CCD stage. In this embodiment, some of the three-dimensional information is saved for further processing. Again, this selective control can be implemented using control circuitry 107 comprising a CMOS multiplexer as described above.

Figure 6:
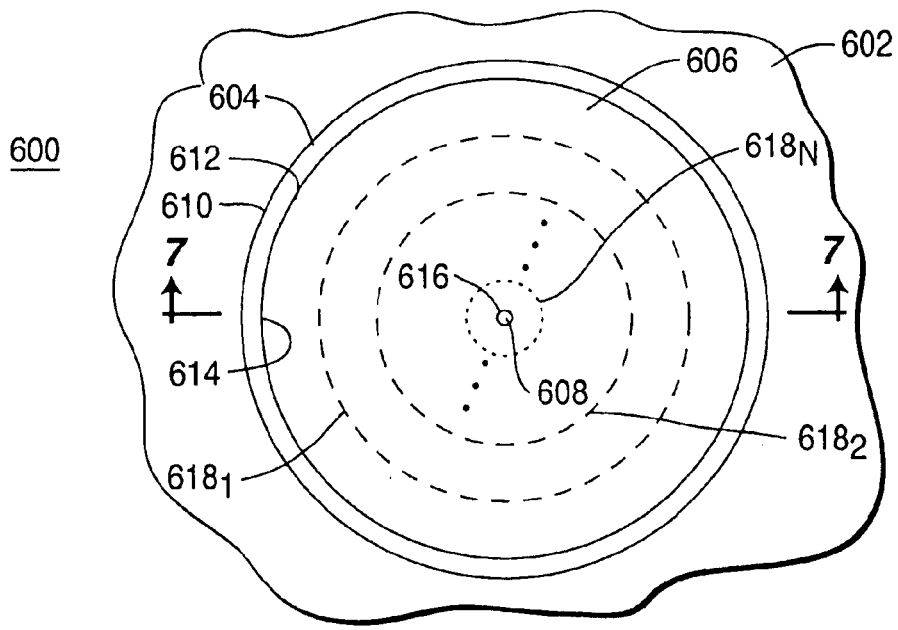
FIG. 6 is a plan view depicting another exemplary embodiment of a drift field detector.

FIG. 6 is a plan view depicting another exemplary embodiment of a drift field detector 600. The drift field detector 600 may be used as a pixel in a detector array of an imaging system, such as the imaging system 100 of FIG. 1. The drift field detector 600 comprises a substrate 602 having a light sensor 604, a drift region 606, and a readout sensor 608. The light sensor 604 comprises an elliptically shaped active area (e.g., circular active area) defined by an outer edge 610 and an inner edge 612. The drift region 606 comprises an elliptically shaped semiconductor drift region defined by an outer edge 614 and an inner edge 616. The drift region 606 is circumscribed by the light sensor 604 such that the outer edge 614 of the drift region 606 is proximate the inner edge 612 of the light sensor 604. A plurality of gates $618_1$ through $618_N$ (collectively referred to as gates 618) are disposed atop the drift region 606, where N is an integer greater than one. The gates 618 are configured as spaced apart concentric ellipses. The readout sensor 608 is circumscribed by the drift region 606 and the innermost gate $618_N$, and is proximate the inner edge 616 of the drift region 606. Due to the elliptical geometry, the drift field detector 600 exhibits a larger fill factor when compared to a drift field detector having a rectangular geometry.

In operation, the light sensor 604 generates a charge proportional to the amount of photon energy incident on the active area defined by the inner and outer edges 610 and 612. The light sensor 604 may comprise any type of light sensitive detector known in the art, where the choice of light sensitive detector is dictated by the particular wavelength of light to be detected. The generated charge is injected into the drift region 606. A voltage differential is established across the gates 618 to produce an electric field within the drift region 606.

The injected charge moves inward within the drift region 606 under the influence of the electric field at a rate determined by the magnitude of the electric field combined with the carrier mobility. A charge distribution is thus formed within the drift region 606 having a certain shape and position determined by both the electric field and thermal diffusion. The electric field is then removed from the drift region 606 in response to various trigger events. For example, the electric field may be established for a pre-defined period of time. Alternatively, the electric field may be deactivated in response to detection of charge at the readout sensor 608. If the drift field detector 600 is part of an array, then the electric field may be deactivated in response to detection of charge at a readout sensor of another one of the drift field detectors in the array.

In any case, when the electric field is removed, the centroid of the charge distribution will remain fixed within the drift region 606, but the shape will continue to disperse due to thermal diffusion. The dispersion is stopped by applying different voltages to the gates over the drift region. In one embodiment of the invention, the charge distribution is binned within the drift region 606 by establishing an alternating high-low voltage potential across the gates 618. The binned charge distribution (e.g., charge histogram) may then be read out of the drift region 606 using the readout sensor 608. Notably, the binned charge may be transported through the drift region 606 using a particular clocked voltage configuration across the gates 618. The charge distribution may be used to determine time-of-arrival of a light pulse, as described above.

Figure 7:
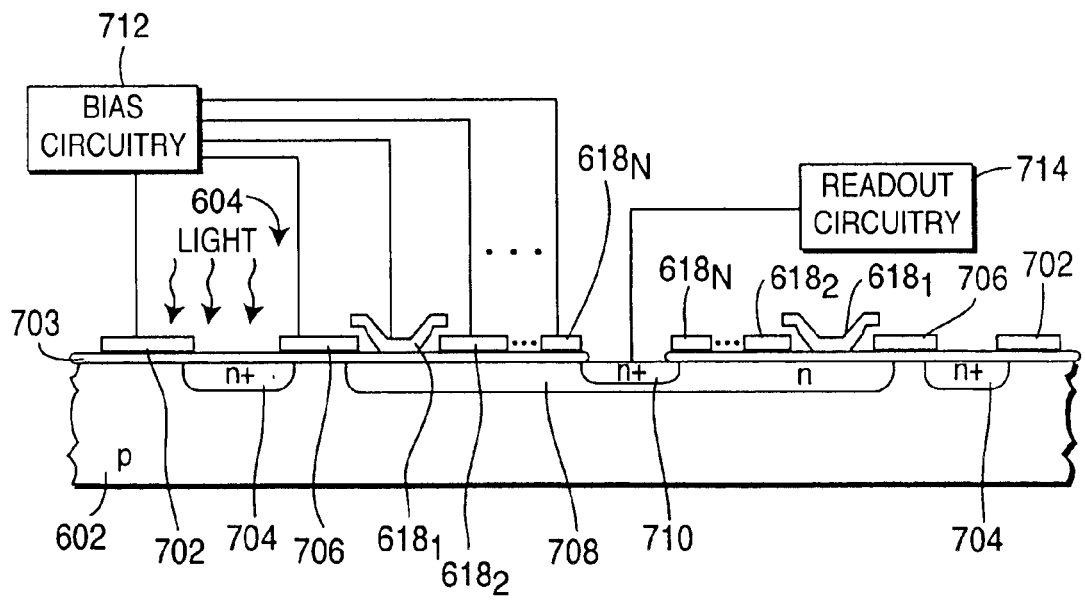
FIG. 7 is a cross-sectional view of an exemplary embodiment of the drift field detector of FIG. 6 taken along the line 7—7.

FIG. 7 is a cross-sectional view of an exemplary embodiment of the drift field detector 600 taken along the line 7—7 of FIG. 6. Elements of FIG. 6 that are the same or similar to those shown in FIG. 7 are designated with identical reference numerals and are described in detail above. In this exemplary embodiment, the substrate 602 comprises p-type silicon. The light sensor 604 illustratively comprises a PN photodiode having an exposure gate 702, an n+ region 704, and a transfer gate 706. The n+ region 704 comprises the active region of the light sensor 604. The drift region 606 comprises an n-type buried-channel 708 formed within the p-type silicon of the substrate 602. The gates 618 of the drift region 606, and the gates 702 and 704 of the light sensor 604, are separated from the substrate 602 by a layer of silicon dioxide ($SiO_2$) 703, as is known in the art. The readout sensor 608 illustratively comprises a floating diffusion sense node 710 defined by an n+ region within the buried-channel 708.

In response to the incident light, photo-generated charge is collected in a potential well formed by the PN junction. The exposure gate 702 controls whether photo-generated charge is collected and acts as an "electronic shutter" for the drift field detector 600. After a pre-defined integration period, a bias may be applied to the transfer gate 706 to inject the collected charge from the light sensor 604 to the drift region 606. As described above, an increasing voltage potential is established across the gates 618 to generate an electric field within the drift region 606. The biasing of the light sensor 604 and the drift region 606 may be controlled via bias circuitry 712. The injected charge drifts under the influence of the electric field and, upon the occurrence of the desired triggering event, the charge is binned by applying an alternating high-low voltage potential across the gates 618 to form a charge distribution. The charge distribution is then read out via the sense node 710 using readout circuitry 714. Notably, a clocked voltage potential may be applied to the gates 618 in order to transfer the charge distribution in a charge-coupled manner to the sense node 710.

Figure 8:
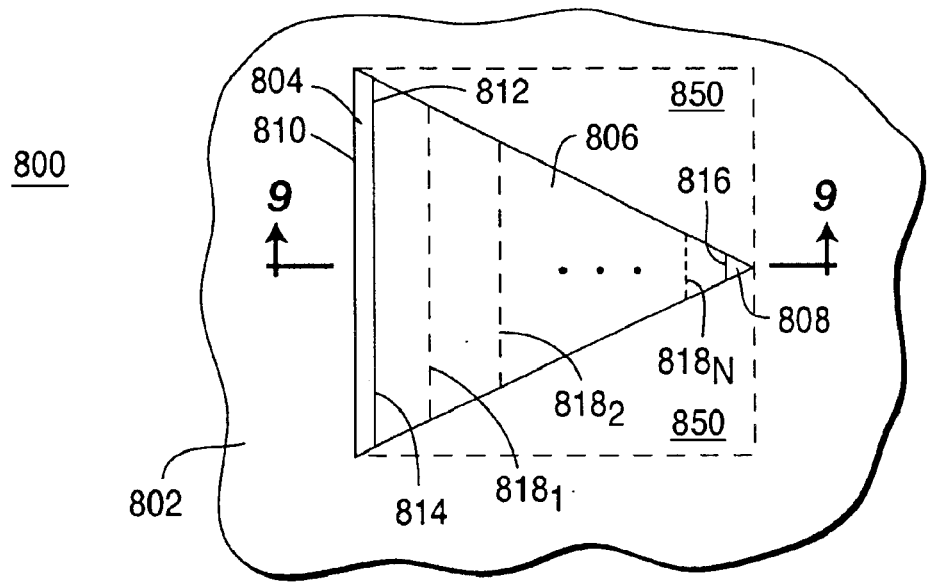
FIG. 8 is a plan view depicting yet another exemplary embodiment of a drift field detector.

FIG. 8 is a plan view depicting yet another exemplary embodiment of a drift field detector 800. The drift field detector 800 may be used as a pixel in a detector array of an imaging system, such as the imaging system 100 of FIG. 1. The drift field detector 800 comprises a substrate 802 having a light sensor 804, a drift region 806, and a readout sensor 808. The light sensor 804 comprises an active area defined by an outer edge 810 and an inner edge 812. The drift region 806 comprises a trapezoidal-shaped semiconductor drift region defined by an outer edge 814 and an inner edge 816. The outer edge 814 of the drift region 806 is proximate the inner edge 812 of the light sensor 804. A plurality of gates $818_1$ through $818_N$ (collectively referred to as gates 818) are disposed atop the drift region 806 in spaced apart relation, where N is an integer greater than one. The readout sensor 808 is proximate the inner edge 816 of the drift region 806. Due to the trapezodial geometry, the drift field detector 800 exhibits a larger fill factor when compared to a drift field detector having a rectangular geometry. To further increase the fill factor, a microlens (see FIG. 9) may be disposed atop the active region of the light sensor 804 to focus the light onto the active region.

In operation, the light sensor 804 generates a charge proportional to the amount of photon energy incident on the active area defined by the inner and outer edges 810 and 812. The light sensor 804 may comprise any type of light sensitive detector known in the art, where the choice of light sensitive detector is dictated by the particular wavelength of light to be detected. The generated charge is injected into the drift region 806. A voltage differential is established across the gates 818 to produce an electric field within the drift region 806, substantially as described above. The injected charge moves inward within the drift region 806 under the influence of the established electric field and a charge distribution is formed within the drift region 806 having a certain shape and position. The electric field is then removed from the drift region 806 in response to a desired trigger event, similar to the embodiments of drift field detectors described above.

When the electric field is removed, the charge distribution will remain fixed within the drift region 806, but the shape will continue to disperse due to thermal diffusion. The dispersion is stopped by applying different voltages to the gates over the drift region. In one embodiment of the invention, the charge distribution is binned within the drift region 806 by establishing an alternating high-low voltage potential across the gates 818. The charge distribution may then be read out of the drift region 806 using the readout sensor 808. Notably, the charge may be transported through the drift region 806 using a particular clocked voltage configuration across the gates 818. The charge distribution may be used to determine time-of-arrival of a light pulse, as described above.

Figure 9:
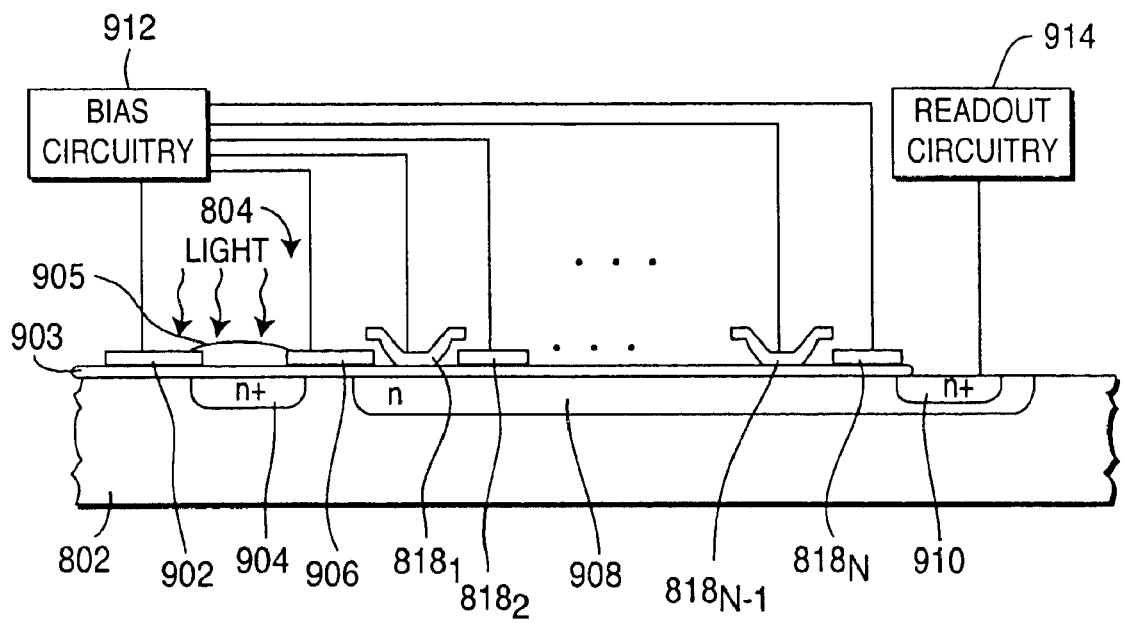
FIG. 9 is a cross-sectional view of an exemplary embodiment of the drift field detector of FIG. 9 taken along the line 9—9.

FIG. 9 is a cross-sectional view of an exemplary embodiment of the drift field detector 800 taken along the line 9—9 of FIG. 8. Elements of FIG. 8 that are the same or similar to those shown in FIG. 9 are designated with identical reference numerals and are described in detail above. In this exemplary embodiment, the substrate 802 comprises p-type silicon. The light sensor 804 illustratively comprises a PN photodiode having an exposure gate 902, an n+ region 904, and a transfer gate 906. The n+ region 904 comprises the active region of the light sensor 804. In one embodiment, a microlens 905 may be disposed above the active region of the light sensor 804 to increase the fill factor of the drift field detector 800.

The drift region 806 comprises an n-type buried-channel 908 formed within the p-type silicon of the substrate 802. The gates 818 of the drift region 806, and the gates 902 and 904 of the light sensor 804, are separated from the substrate 802 by a layer of $SiO_2$ 903, as is known in the art. The readout sensor 808 illustratively comprises a floating diffusion sense node 910 defined by an n+ region within the buried-channel 908. The light sensor 804 and the drift region 806 operate in a manner similar to the light sensor 604 and drift region 606 described above with respect to FIGS. 6 and 7. Notably, the biasing of the light sensor 804 and the drift region 806 may be controlled via bias circuitry 912. The charge distribution may be read out via the sense node 910 using readout circuitry 914. The triangular drift region 806 occupies less area than a rectangular drift region, allowing the control circuitry (e.g., bias circuitry 912 and readout circuitry 914) to be placed within a saved area 850 (FIG. 8).

For purposes of clarity by example, the drift field detectors 600 and 800 have been described as having a p-type silicon substrate. Those skilled in the art will appreciate, however, that the substrate may be formed of n-type silicon. In such an embodiment, the buried-channel is formed of p-type silicon, the light sensor includes a p+ region, and the sense node includes a p+ region. In addition, although the light sensors 604 and 804 have been described as a PN photodiodes, those skilled in the art will appreciate that other types of light sensors may be employed, including other types of silicon photodetectors (e.g., PIN photogate), as well as a platinum silicide detectors, a III–IV detectors, and the like along with the appropriate readout circuitry. Furthermore, those skilled in the art will appreciate that other types of readout sensors 608 and 808 may be used, including floating gate readouts, current amplifiers, and transimpedance amplifiers. Moreover, although aspects of the invention are described with respect to elliptical and trapezoidal drift regions, those skilled in the art will appreciate that drift regions of other shapes may be employed. In general, a drift field detector of the invention includes a drift region having an outer edge and an inner edge, where the volume of the drift region decreases from the outer edge to the inner edge.

A method and apparatus for generating charge from a light pulse has been described. A drift field detector includes a light sensor and a semiconductor drift field. The light sensor generates electric charge in response to a light pulse and the charge is injected into the drift region. Under influence of an electric field, the photo-generated charge drifts through the drift region. The electric field is deactivated in response to a desired triggering event. A charge distribution within the drift region is either stored in an analog storage device and read out, or is read out directly from the drift region using a sense node. By determining the distance the photo-generated charge drifted within the drift region, the time-of-arrival of the light pulse may be determined with respect to the time the electric field was deactivated with sub-nanosecond accuracy. In one embodiment, the drift field detector is used within an array of detectors. A light pulse illuminates a target and the reflected portions of the illuminating pulse are focused onto the array. The relative times-of-arrival of the different reflected portions may be identified and used to determine the depth and contours of the target.

While the foregoing is directed to embodiments of the present invention, other and further embodiments of the invention may be devised without departing from the basic scope thereof, and the scope thereof is determined by the claims that follow.

What is claimed is:

1. An apparatus for generating charge from a light pulse, comprising:
    a substrate;
    a light sensor having an active region for generating an electric charge in response to a light pulse; and
    a drift region, formed in said substrate, for receiving said electric charge from said light sensor and producing a spatial charge distribution therein in response to an electric field, said drift region having an outer edge and an inner edge, where a volume of said drift region decreases from said outer edge to said inner edge.

2. The apparatus of claim 1, wherein said drift region is an elliptical drift region and said active region of said light sensor is an elliptical active region circumscribing said elliptical drift region.

3. The apparatus of claim 2, further comprising:
    a plurality of concentric elliptical gates disposed on said substrate above said elliptical drift region.

4. The apparatus of claim 3, further comprising:
    bias circuitry for applying a voltage across said plurality of concentric elliptical gates to generate said electric field.

5. The apparatus of claim 1, wherein said drift region is a trapezoidal drift region.

6. The apparatus of claim 5, further comprising:
    a plurality of gates disposed on said substrate above said trapezoidal drift region.

7. The apparatus of claim 6, further comprising:
    bias circuitry for applying a voltage across said plurality of gates to establish said electric field.

8. The apparatus of claim 1, further comprising:
    a readout sensor, formed in said substrate proximate said inner edge, for providing said spatial charge distribution as output.

9. The apparatus of claim 8, further comprising:
    readout circuitry for reading out said spatial charge distribution using said readout sensor.

10. The apparatus of claim 1, further comprising:
    one or more microlenses disposed over said active region of said light sensor.

11. A method of generating charge from a light pulse, comprising:
    generating an electric charge in response to a light pulse;
    injecting said electric charge into a drift region formed in a substrate, said drift region having an outer edge and an inner edge, where a volume of said drift region decreases from said outer edge to said inner edge; and
    applying an electric field to said drift region to produce a spatial charge distribution therein.

12. The method of claim 11, wherein said drift region is an elliptical drift region.

13. The method of claim 12, wherein said step of applying an electric field comprises:
    applying a voltage potential across a plurality of concentric elliptical gates disposed on said substrate above said elliptical drift region.

14. The method of claim 11, wherein said drift region is a trapezoidal drift region.

15. The method of claim 14, wherein said step of applying an electric field comprises:
    applying a voltage potential across a plurality of spaced apart gates disposed on said substrate above said trapezoidal drift region.

16. The method of claim 11, further comprising:
    recovering said spatial charge distribution from said drift region using a readout sensor.

17. An apparatus for resolving time-of-arrival of a light pulse, comprising:
    a substrate;
    a light sensor having an active region for generating an electric charge from a light pulse;
    a drift region, formed in said substrate, for receiving said electric charge and producing a spatial charge distribution therein in response to an electric field; and
    a control circuit for determining a time-of-arrival of said light pulse in response to a position of said spatial charge distribution within said drift region.

18. The apparatus of claim 17, wherein said drift region comprises an outer edge and an inner edge, and wherein a volume of said drift region decreases from said outer edge to said inner edge.

19. The apparatus of claim 18, wherein said drift region is an elliptical drift region and said active region of said light sensor is an elliptical active region circumscribing said elliptical drift region.

20. The apparatus of claim 19, further comprising:
    a plurality of concentric elliptical gates disposed on said substrate above said elliptical drift region.

21. The apparatus of claim 19, wherein said drift region is a trapezoidal drift region.

22. The apparatus of claim 21, further comprising:
    a plurality of gates disposed on said substrate above said trapezoidal drift region.

23. The apparatus of claim 19, further comprising:
    a readout sensor, formed in said substrate proximate said inner edge, for providing said spatial charge distribution as output.

24. The apparatus of claim 17, further comprising:
    an analog storage device for storing said spatial charge distribution.

25. The apparatus of claim 24, wherein said analog storage device comprises a charge-coupled device (CCD) register having a plurality of bins.

26. The apparatus of claim 17, wherein said drift region comprises an n-buried channel or a p-buried channel formed in said substrate.

27. A method for resolving time-of-arrival of a light pulse, comprising:
    generating an electric charge from a light pulse;
    injecting said electric charge into a drift region formed in a substrate;
    applying an electric field to said drift region to produce a spatial charge distribution therein; and
    determining a time-of-arrival of said light pulse in response to a position of said spatial charge distribution within said drift region.

* * * * *